No. 660,559. Patented Oct. 30, 1900.
I. CHURCH.
EXPANSION BOLT.
(Application filed June 3, 1899.)

(No Model.)

WITNESSES:
David C. Walter
L. E. Brown

INVENTOR:
Isaac Church,
By his Attorney,

THE NORRIS PETERS CO., PHOTO-LITHO., WASHINGTON, D. C.

UNITED STATES PATENT OFFICE.

ISAAC CHURCH, OF TOLEDO, OHIO.

EXPANSION-BOLT.

SPECIFICATION forming part of Letters Patent No. 660,559, dated October 30, 1900.

Application filed June 3, 1899. Serial No. 719,171. (No model.)

*To all whom it may concern:*

Be it known that I, ISAAC CHURCH, a citizen of the United States, residing at Toledo, Lucas county, Ohio, have invented certain new and useful Improvements in Expansion-Bolts, of which the following is a specification.

In many of the expansion-bolts now in use the familiar objections encountered are that the various parts become separated and lost, the loss of a single part making the entire device useless. Another objection is the difficulty of keeping the bolt and the sleeve and the interior nut in alinement, so that the bolt will properly enter its nut.

My invention relates to and one object is to provide means for overcoming the difficulties here indicated and to provide a cheap, simple, and efficient expansion-bolt in which the parts in their manufacture are assembled for use in such manner that they will not become separated and in such manner that the nut is so held that the bolt shall always enter in correct alinement.

A further object of my invention is to provide for the ready and easy radial expansion of the sleeve of the bolt.

I attain these objects by means of the device hereinafter described and shown, and illustrated in the accompanying drawings, made part hereof, in which—

Figure 1:
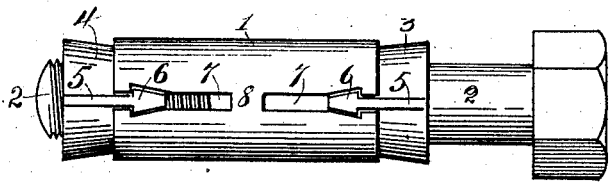
Figures 2, 3:
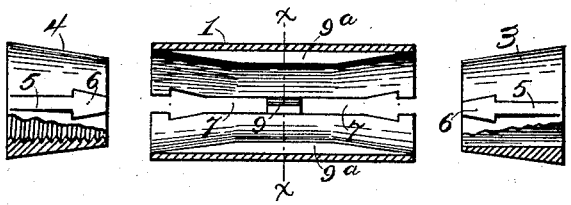
Figure 4:
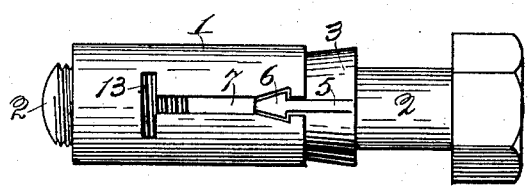
Figures 5, 6:
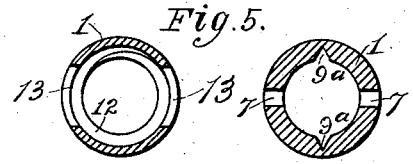

Figure 1 is a side elevation of my device with the parts assembled ready for operation; Fig. 2, a view in detail of the shell and the nuts detached and partly in longitudinal section; Fig. 3, a transverse section on line $xx$, Fig. 2; Fig. 4, a side elevation of a modified form of my device hereinafter described; Fig. 5, transverse sections of the modified shell on lines $yy$ and $zz$, Fig. 7; Fig. 6, a side elevation of the nut hereinafter referred to, seen at a right angle to the point of view in Fig. 2; and Fig. 7 a central longitudinal section of the sleeve of my bolt shown in Fig. 4.

Like numerals of reference indicate like parts throughout the drawings.

In the drawings, 1 is a cylindrical shell or sleeve designed to be expanded within any suitable recess prepared to receive it.

2 is a bolt threaded at its inner extremity and having a head at its outer end.

3 is an expander in the form of a truncated cone and having its smaller end entered within the annular space between the bolt and sleeve.

4 is an expansion-nut in the form of a truncated cone threaded to receive the bolt 2, the nut having its smaller end entered in the annular space between the sleeve and bolt at their inner end.

In the form of my device illustrated in Figs. 1, 2, and 3 the sleeve has in its interior, at each end, inclined surfaces which flare outwardly funnel-like from near the middle of the sleeve. These inclined surfaces correspond with the externally-inclined surfaces of the expansion-piece 3 and nut 4. The beveled surfaces here referred to may as an equivalent be formed upon tapered polygons instead of upon cones. Formed integral with the two pieces 3 and 4 are radially-projecting portions, which in the present example are longitudinal splines or feathers 5, arranged at equidistant intervals around the pieces 3 and 4. In the example shown two splines or feathers arranged at opposite sides of the pieces 3 4 are employed, and for ordinary uses this will be found sufficient. Each of the splines at its inner end terminates in a barbed dart or "spear-head" 6. The sleeve of the form of device in question is slotted longitudinally from each end toward the middle, as at 7. Near their outer ends these slots are enlarged to conform to and to receive the spear-heads or other projections on the pieces 3 and 4. In the manufacture of this device the sleeve is made, preferably, of malleable iron and will yield sufficiently to allow the introduction of the cone-shaped pieces 3 and 4 such distance that the barbed parts 6 will engage with the corresponding recesses in the sleeve. This being done, the sleeve may be pressed back into cylindrical shape.

The slots 7, of which there are preferably two at each end of the expansion-sleeve 1 and which are arranged at opposite sides thereof, do not extend quite to the middle of the sleeve. Hence there is left at the middle of the sleeve an uncut zone, as at 8. This uncut zone is provided at one side with a deep channel or groove 9, running parallel with the axis of the sleeve and in alinement with two of the slots 7. (See Fig. 2.) The sleeve is also provided with interior longitudinal channels or grooves $9^a$, running parallel with the slots 7.

The operation of my device thus far described is as follows: The sleeve 1, with the pieces 3 and 4 in place, is inserted into the hole prepared for it. The plate, block, or other piece to be secured is placed over the hole. The bolt 2 is passed through an aperture in the plate or block and is screwed into the nut 4. The wedge-like action of the conical surfaces of the pieces 3 and 4 now press outwardly upon the sleeve so powerfully that the thin portion of metal at the bottom of the groove or channel 9 is ruptured, and the cylinder thus split on one side is caused to open or unfold upon the lines $9^a$, thus insuring the desired expansion of the sleeve or shell. The device is now firmly held in place. It will be seen that the nut 4 by means of the spline and groove is held in correct alinement, thus insuring the proper entry of the bolt 2.

Figure 7:
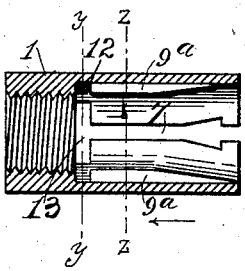

In the device illustrated in Fig. 4 and the subsequent figures in the drawings I dispense with the separate nut 4 and form a screw-thread upon the interior of the sleeve 1 at its inner end, as shown in Fig. 7. The expausion-piece 3 is formed in the same manner and engaged with the sleeve as hereinbefore described. The end of the sleeve next the bolt is provided with interiorly-inclined surfaces and is slotted and grooved in the same manner as above described. To insure the spread of the partly-separated segments of the sleeve, I provide upon its interior, near its middle, a deep circumferential groove or channel 12, which channel at opposite sides of the sleeve is cut entirely through the metal, as at 13.

In the modified form of my device when the bolt is turned the sleeve and expansion-piece 3 are drawn toward each other, and the wedge-like action of the expansion-piece insures the proper expansion of the split portions of the sleeve on line 12 and the stability of the device in place.

Having described my invention, what I claim, and desire to secure by Letters Patent, is—

1. In an expansion-bolt, a cylindrical shell having a longitudinal slot extending from its open end toward the middle of the shell, which slot has a recess or enlarged portion, combined with a conical expansion-piece adapted to enter the open end of the shell, and a radially-projecting portion upon said expansion-piece adapted to slide in said longitudinal slot and to engage said enlarged or recessed portion of the slot.

2. An expansion-bolt comprising a threaded bolt, a sleeve longitudinally slotted from each end inwardly to near its middle, a conical nut adapted to enter the open end of the sleeve, a conical expansion-piece adapted to enter the opposite end of the open sleeve, radial projections upon the nut and upon the expansion-piece, recesses in the longitudinal slots of the sleeve coinciding with and adapted to engage said radial projections, and deep channels or grooves upon the interior of the sleeve, whereby, when the conical pieces are forced inwardly, the sleeve is ruptured or bent on the lines of said channels or grooves.

3. In an expansion-bolt, an integral cylindrical sleeve longitudinally slotted from each end inwardly to near its middle, forming an uncut zone or ring at the middle of the sleeve, and deep channels or grooves in said zone or ring, substantially as and for the purpose specified.

ISAAC CHURCH.

Witnesses:
 WILBER A. OWEN,
 L. E. BROWN.